United States Patent [19]

Iwasa

[11] Patent Number: 4,736,589
[45] Date of Patent: Apr. 12, 1988

[54] DEVICE FOR CONTROLLING SUPERCHARGING PRESSURE OF AN EXHAUST GAS TURBOCHARGER

[75] Inventor: Yoshio Iwasa, Nagareyama, Japan
[73] Assignee: Nissan Motor Co., Ltd., Kanagawa, Japan
[21] Appl. No.: 387
[22] Filed: Jan. 5, 1987

Related U.S. Application Data

[63] Continuation of Ser. No. 703,951, Feb. 22, 1985, Pat. No. 4,658,586.

[30] Foreign Application Priority Data

Feb. 24, 1984 [JP] Japan ................... 59-32677

[51] Int. Cl.[4] ......................................... F02B 37/12
[52] U.S. Cl. .................................................. 60/602
[58] Field of Search ............. 60/600, 601, 602, 603; 415/144, 145, 151

[56] References Cited

U.S. PATENT DOCUMENTS 2,944,786 7/1960 Angell et al. .
4,483,146 11/1984 Morikawa ........................ 60/602

FOREIGN PATENT DOCUMENTS 18522 2/1983 Japan ........................ 60/602
37228 2/1984 Japan ........................ 60/602
1554074 10/1979 United Kingdom .
2062116 5/1981 United Kingdom .

Primary Examiner—Michael Koczo
Attorney, Agent, or Firm—Schwartz, Jeffery, Schwaab, Mack, Blumenthal & Evans

[57] ABSTRACT

A supercharging pressure controlling device for an exhaust gas turbocharger having a turbine and a compressor comprising a velocity control device for exhaust gas flow and a bypass valve control device the bypass valve control device provided into the bypass channel for the turbine to increase the opening when the downstream supercharging pressure of the compressor exceeds a first set value. The velocity control device controls the exhaust gas velocity by varying the degree of valve opening when the downstream supercharging pressure of the compressor exceeds a second set value, wherein the first set value of the supercharging pressure is higher than the second set value.

10 Claims, 5 Drawing Sheets

DEVICE FOR CONTROLLING SUPERCHARGING PRESSURE OF AN EXHAUST GAS TURBOCHARGER

This is a continuation of application Ser. No. 703,951, filed Feb. 22, 1985, now U.S. Pat. No. 4,658,586.

BACKGROUND OF THE INVENTION

1. Field of the Invention

The present invention relates to a device for controlling the supercharging pressure of an exhaust gas turbocharger for an internal combustion engine in which the internal combustion engine is supplied with an intake gas for supercharging by a compressor which is rotated together with an exhaust gas turbine rotated by the energy of the exhaust gas from the internal combustion engine.

2. Description of the Prior Art

It is common that an internal combustion engine is equipped with an exhaust gas turbocharger to utilize the exhaust gas energy to supercharge intake air to the internal combustion engine, thereby increasing the intake air charging efficiency and therefore the amount of fuel injection, which greatly contributes to the increase of the engine output.

However, if the supercharging pressure becomes excessive, excessive stress is applied onto the internal combustion engine and onto its intake and exhaust gas system, thereby damaging them. Accordingly, many devices have been developed to prevent excessive increase in supercharging pressure.

An example of these devices is a velocity control device for exhaust gas flow as is described in U.S. Pat. No. 2,944,786. In this device, a control valve is provided in an exhaust gas intake port section of an exhaust gas turbocharger to adjust the degree of opening of the control valve, thereby controlling the velocity of the flow of the exhaust gas in the inlet port leading to the exhaust gas turbine so as to prevent an excessive rotation rate in the exhaust gas turbine. Consequently, the excessive supercharging pressure by the compressor coupled directly to the turbine is prevented while increasing the exhaust gas flow velocity in low load operation to increase the supercharging pressure in this operating state, thereby increasing the output.

Another example has a bypass channel provided to connect the upstream and downstream sides of the exhaust gas turbine, and the bypass channel is provided with a bypass control valve means which is adapted to open when the supercharging pressure in the bypass channel on the downstream side of the compressor reaches above a set value. When the supercharging pressure on the downstream side of the compressor exceeds a specified value, the bypass control valve means opens and the energy of the exhaust gas is exhausted to the outside through the bypass channel so that it does not act to rotate the exhaust gas turbine. This prevents excessive rotation of the exhaust gas turbine and consequently excessive increase in the super-charging pressure.

The velocity control device for exhaust gas flow and the bypass control valve device can effectively carry out supercharger pressure control, but the following inconveniences still remain.

Namely, in the velocity control device for exhaust gas flow, when the supercharging pressure exceeds the set value, the cross-sectional area of the exhaust gas inlet port is enlarged to decrease the flow velocity of the exhaust gas introduced into the exhaust gas turbine. But all the amount of the exhaust gas is introduced into the exhaust gas turbine and is not bypassed, so that when the exhaust gas energy is further increased, the rotation of the exhaust gas turbine cannot be controlled and the super-charging pressure is ultimately increased. Accordingly, the original structure design of the exhaust gas turbocharger must ensure that the increased amount of supercharging pressure is below an allowable value. For this reason, the overall torque characteristics must be set to generally produce low supercharging pressure throughout the entire engine operations including the low load operating of the engine. However, this results in that the supercharging pressure is reduced in the low load region as mentioned above, which is a problem area in the case of the exhaust gas turbocharger, thus making it difficult to improve the output characteristics in this operating region.

Now according to the bypass control valve means, when the supercharging pressure exceeds the set value, the exhaust gas is introduced into the bypass channel by the bypass control valve means, and is not used in the region of rotation of the exhaust gas turbine. It therefore functions as an effective means for preventing an excessive increase in the super-charging pressure. However, the torque characteristics determined by the structure of the exhaust gas turbocharger are constant, and simply act to prevent the excessive supercharging pressure, which does not solve the problems of the low super-charging pressure in the low load region. It should be further noted that with such a bypass control device, immediately after the bypass control valve is opened, the exhaust gas turbine rotates at an excessive speed due to the effect of its inertia, causing insufficient reduction of the supercharging pressure and generating knocking. The back pressure is rapidly lowered, giving rise to the fear that a catalytic device in the exhaust system could be damaged.

In addition, it was found out that when either of these devices is used separately and unoperated due to breakdown or seizure, the exhaust gas turbine and compressor rotate at an abnormally high speed and the supercharging pressure increases excessively, thereby generating knocking or engine damage.

Therefore, these devices as mentioned above must be further improved, and development is still required in the gas intake system for supercharging in order to maintain flow flexibility and pressure variability throughout the operation.

SUMMARY OF THE INVENTION

An object of the present invention is to provide a supercharging pressure controlling device having improved flow flexibility and pressure variability throughout the operation.

Another object of the present invention is to provide a supercharging pressure controlling device for improving the output characteristics in the low load operation of an internal combustion engine while preventing an excessively high supercharging pressure throughout the operation.

Another object of the present invention is to provide a supercharging pressure controlling device which is capable of suppressing knocking or engine damage.

Briefly described, these and other objects of the present invention are accomplished by providing an improved supercharging pressure controlling device comprising a velocity control device of the exhaust gas flow, a bypass control valve means, and a control means for controlling the velocity control device and the bypass control valve means such that the velocity control device is opened at a predetermined pressure value smaller than that of the bypass control valve means. As a result, the velocity control device is activated before the bypass control valve means is activated, which prevents an excessive increase in supercharging pressure. When the supercharging pressure is increased beyond an allowed supercharging pressure of the velocity control device, the bypass control valve device is activated to prevent this increase.

BRIEF DESCRIPTION OF THE DRAWINGS

The other objects, features and advantages of the present invention will become more apparent from the following description of the preferred embodiments taken in conjunction with the accompanying drawings, in which.

DESCRIPTION OF THE PREFERRED EMBODIMENT

The preferred embodiments of the present invention will be next described, with reference to the drawings.

Figure 1:
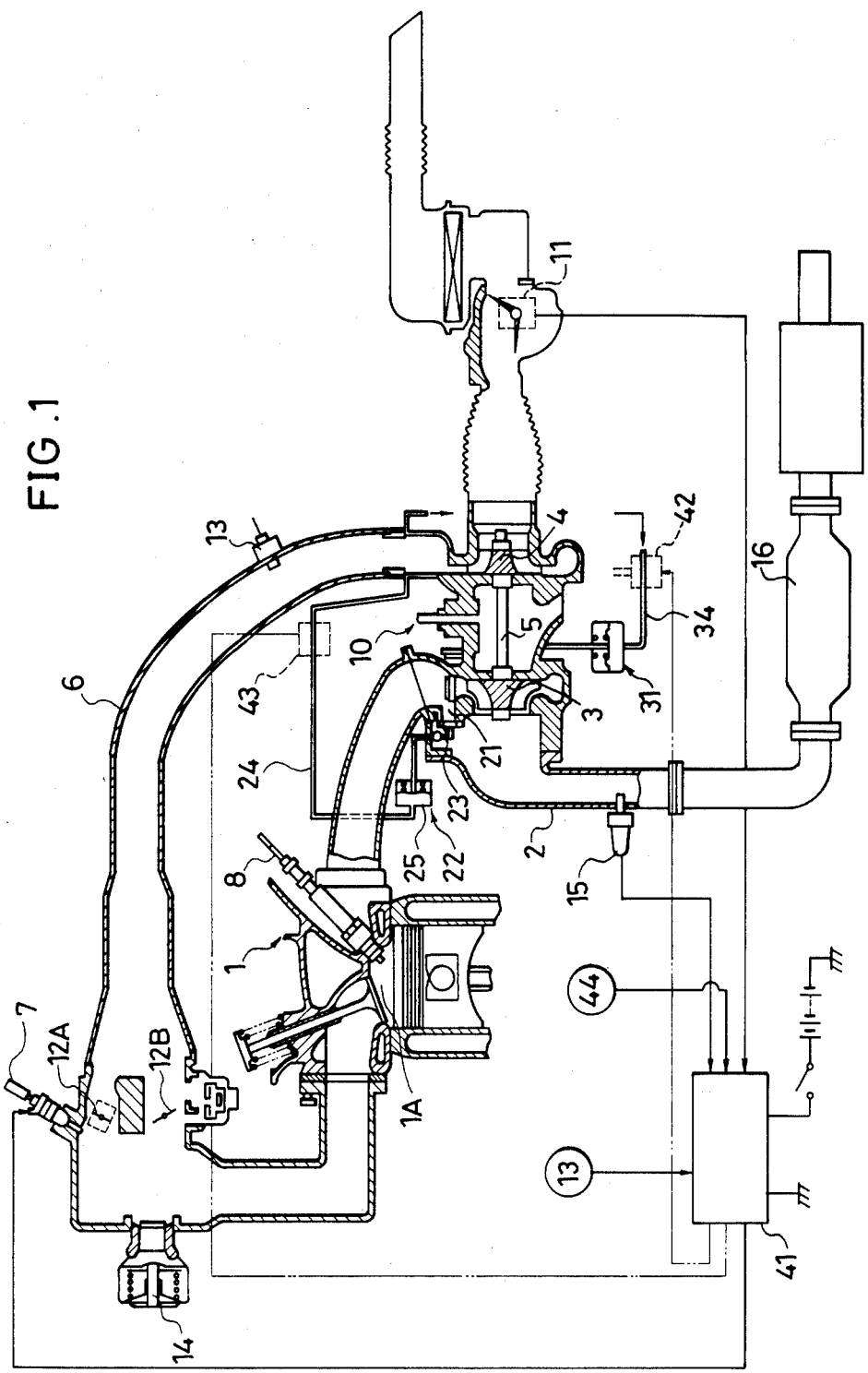
FIG. 1 is a structural view of a supercharging pressure controlling device embodying the present invention.

Now referring to FIG. 1, exhaust generated by the combustion of fuel in an internal combustion engine rotates an exhaust gas turbine 3 which is positioned in an exhaust gas duct 2, and is then discharged to the atmosphere. The exhaust gas turbine 3 is coupled to a compressor 4 through a shaft 5, and the exhaust gas turbine 3, the compressor 4 and the shaft 5 constitute an exhaust gas turbocharger 10. The compressor 4 is rotated together with the exhaust gas turbine 3. In this arrangement, intake air compressed (supercharged) by the compressor 4 passes through an intake duct 6 into the internal combustion engine 1 together with the fuel injected from a fuel injection valve 7. Further, an air flowmeter 11 is provided on the upstream side of the compressor 4 in the inlet duct 6. A plurality of intake air throttle valves 12A, 12B are disposed between the compressor 4 and the injection valve 7 to control the amount of the intake air. A pressure sensor 13 for detecting the supercharging pressure is provided between the intake air throttle valve 12A and the compressor 4. On the downstream side of the intake air throttle valve 12A, a relief valve 14 is provided which opens to relieve excessive pressure if the pressure on the downstream side of the intake air throttle valve 12A exceeds an allowable pressure. The pressure at which the relief valve 14 opens is set to be higher than that at which a bypass control valve device 22 opens, as described later. In addition, an oxygen sensor 15 which detects the oxygen concentration in the exhaust gas, and a catalytic device 16 which removes the unburned components in the exhaust gas are provided in the exhaust duct 2 on the downstream side of the exhaust gas turbine 3.

In the present invention, the bypass control valve device 22 is provided in a bypass duct 21 which introduces the exhaust gas so as to bypass the exhaust gas turbine 3, and a velocity control device 31 for exhaust gas flow is provided at the intake duct of the exhaust gas turbine 3.

Figure 2:
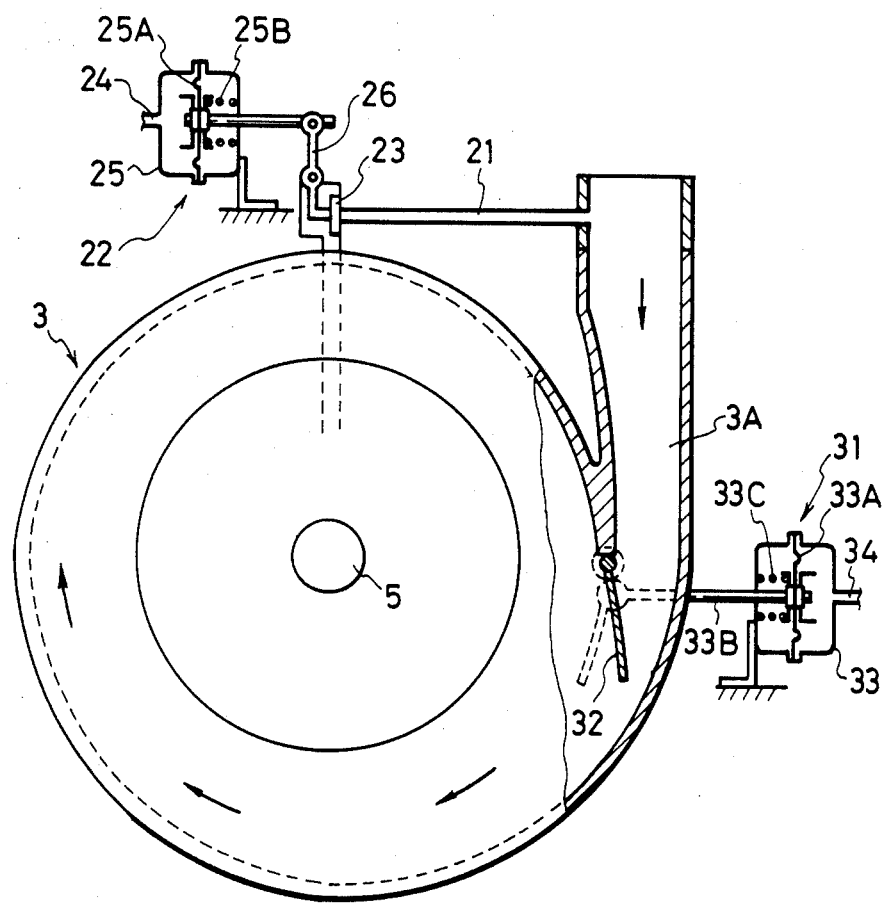
FIG. 2 is a side view of an exhaust gas turbine section of the device shown in FIG. 1.
Figure 3:
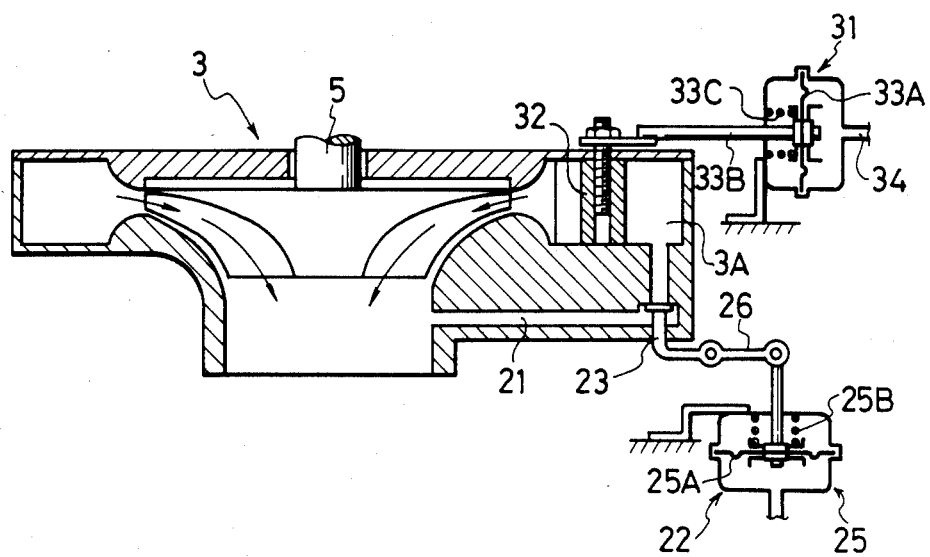
FIG. 3 is a vertically sectional view of the exhaust gas turbine section of the device shown in FIG. 2.
Figure 4:
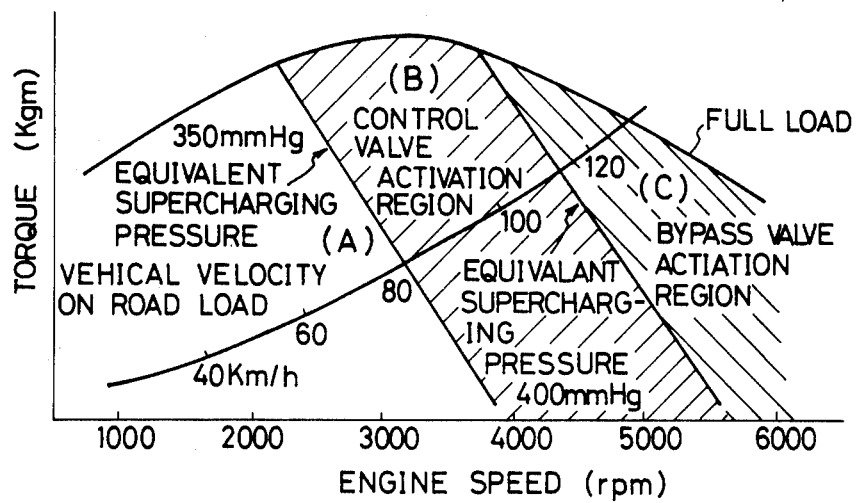
FIG. 4 is a characteristic diagram showing operating regions in the embodiment of the present invention.
Figure 5:
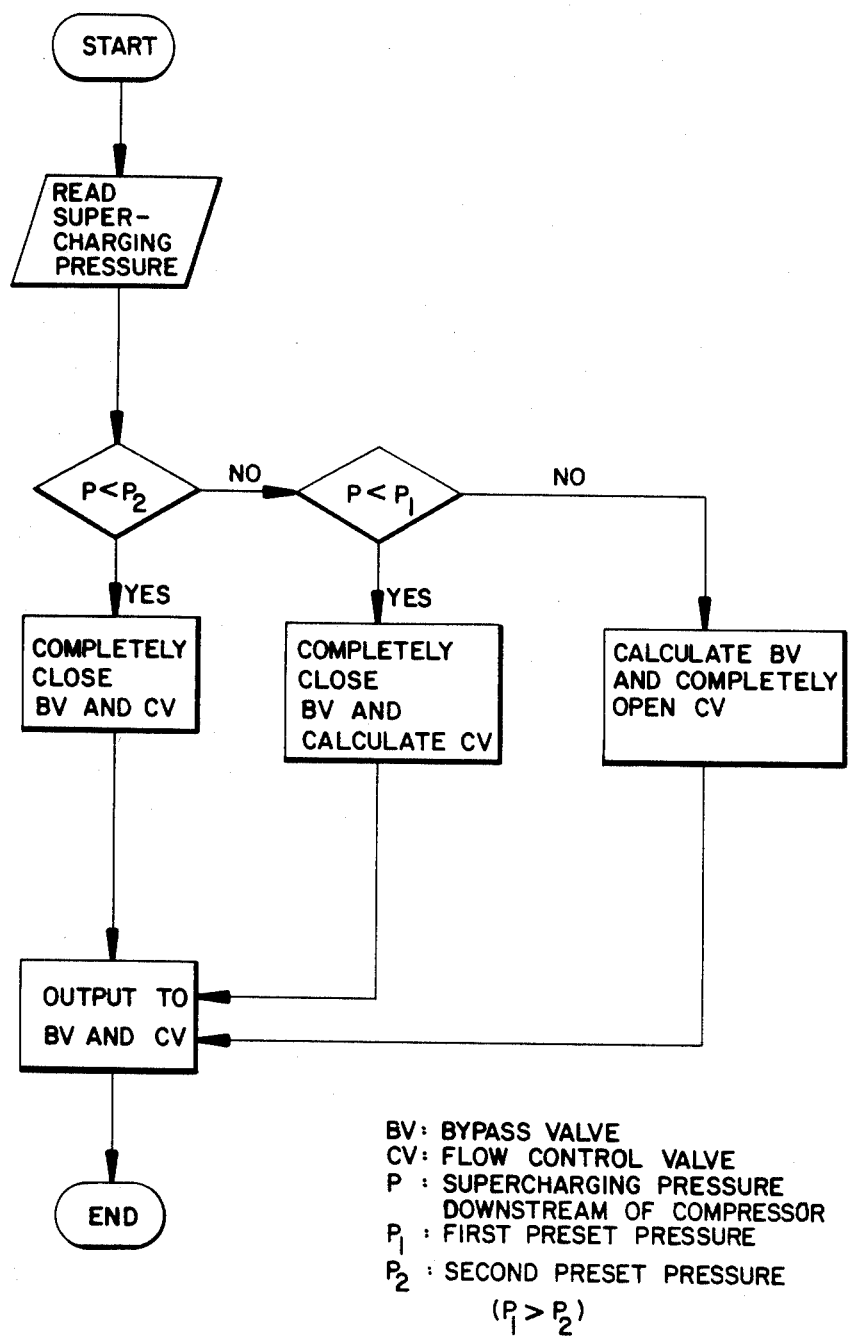
FIG. 5 is a flow chart which explains the operation of the exhaust gas flow control valves.

In the bypass control valve device 22, as shown in FIGS. 1, 2, and 3, a bypass valve 23 for opening and closing the bypass duct 21 is connected through a link 26 with a diaphragm 25A of a diaphragm device 25 into which the supercharging pressure on the upstream side of the intake air throttling valve 12A and on the downstream side of the compressor 4 is supplied through a pressure duct 24, whereby when the supercharging pressure exceeds a set point Pb, the diaphragm 25A, in response to the supercharging pressure, opposes the force of a spring 25B in the valve closing direction, and acts to open the bypass valve 23.

Accordingly, in the velocity control device for the exhaust gas flow, the bypass control valve device prevents an excessive increase in supercharging pressure. This solves the problems caused when the supercharging pressure is increased only by the velocity control device as mentioned above with reference to the prior art. Accordingly, the pressure value set for valve opening can be adequately increased to increase the supercharging pressure over the entire operating range. It therefore becomes possible to increase the supercharging pressure and improve the torque characteristics in the low load range. On the other hand, the velocity control device for exhaust gas flow is activated before the bypass control valve device is activated, so that the overspeed of the exhaust gas turbine is prevented and the frequency of the use of this bypass control device is minimized. The occasions where an excessive rotation of the exhaust gas turbine is caused by inertia at an initial stage of valve opening does not occur so often and knocking or engine damage is almost suppressed.

The velocity control device 31 for exhaust gas flow has a throttle valve 32 provided in the intake port section 3A of the exhaust gas turbine 3, i.e., in the exhaust gas scroll intake port section, as shown in FIGS. 2 and 3. The throttle valve 32 is pivotally supported at its upstream end by the casing of the intake section of the exhaust gas turbine 3. When the downstream free end of the throttle valve 32 is shifted so that the opening area of the intake section 3A is reduced (indicated by the solid lines on the drawing), the exhaust gas flow velocity increases, whereas when the downstream free end is shifted so that the opening area of the intake section 3A is increased (indicated by the dashed lines on the drawing), the exhaust gas flow velocity decreases.

The throttle valve 32 is connected to a diaphragm 33A of a diaphragm device 33 by a rod 33B. The supercharging pressure at the upstream side of the intake throttle valve 12A is introduced at the downstream side of the compressor 4 through a pressure duct 34. When this supercharging pressure exceeds the set point Pa, the diaphragm 33A, in response to the super-charging pressure, opposes the elastic force of a spring 33C and is displaced in a direction to increase the open area of the intake section 3A of the exhaust turbine to increase, thereby decreasing the flow velocity of the exhaust gas.

The important point here is that the set point Pa (e.g. about 350 mm Hg) at which the velocity control device 31 is opened is smaller than the set point Pb (e.g. 400 mm Hg) at which the bypass control valve device 22 is opened.

Next the operation of such a device will be described.

In steady state operation, the intake air is compressed by the compressor 4, subjected to the volume adjustment by the action of the intake throttle valves 12A and 12B, and is mixed with fuel injected from the injection valve 7 to form a mixed gas, which is introduced into a combustion chamber 1A of the internal combustion engine 1. At this point the mixed gas is ignited through the activation of a spark plug 8. The combustion gas is discharged into the exhaust duct 2 and its flow velocity is controlled by the velocity control device 31 to rotate the exhaust gas turbine 3 and the compressor 4 on the same shaft. The exhaust gas is then discharged to the atmosphere. Here, because the velocity control device 31 closes the throttle valve 32 to increase the flow velocity of the exhaust gas, the driving energy from the exhaust gas turbine 3 is comparatively large, which prevents the reduction of the supercharging pressure in this region.

Here the rotational velocity of the engine increases and a lot of the exhaust gas is discharged, the rotation of the exhaust gas turbine 3 increases by the increase of the exhaust gas energy. The compressor 4 rotates at a high speed so that the supercharging pressure on the downstream side increases.

When this supercharging pressure is increased above the predetermined pressure Pa set to open the velocity control device 31, the supercharging pressure is introduced into the diaphragm device 33 as shown in FIG. 2, and the throttle valve 32 is opened against the elastic force of the spring 33C. As a result, the throttle valve 32 is displaced from the position indicated by the solid lines in FIG. 2 to the position indicated by the broken lines, and the open area of the intake port area 3A increases, reducing the exhaust gas flow velocity. For this reason, an increase in the rotational speed of the exhaust gas turbine 3 is restricted and a large intake air supercharging pressure is avoided. In addition, the pressure (back pressure) in the exhaust duct 2 upstream from the exhaust gas turbine 3 simultaneously decreases, whereby the pumping loss of the internal combustion engine 1 decreases, preventing reduction in output power.

Further, in the case where the internal combustion engine 1 is rotating at a high velocity under high load, the amount of exhaust gas discharged from the engine is great. Therefore, even when the velocity control device for exhaust gas flow is in the completely opened state, the total amount of the exhaust gas is used to rotate the exhaust gas turbine 3. Thus, the exhaust gas turbine 3 is rotated at a high speed, and the compressor 4 is also rotated at a high speed, so that the supercharging pressure is increased. At this time, when the supercharging pressure then exceeds the pressure Pb set to open the bypass control valve device 22, this supercharging pressure is introduced into the diaphragm device 25 and activates the diaphragm 25A against the elastic force of the spring 25B, thereby opening the bypass valve 23 through the link 26. Consequently, the exhaust gas in the exhaust duct 2 upstream from the exhaust gas turbine 3 is introduced onto the downstream side of the turbine 3 through the bypass duct 21. As a result, the rotational speed of the exhaust gas turbine 3 and the compressor 4 decreases, preventing excessive supercharging pressure, thus increasing the durability of the shaft 5. In addition, it prevents knocking in the internal combustion engine 1 as well as damage to the engine body and its intake and exhaust system. Thus the supercharging action of the exhaust gas turbocharger can be utilized at a maximum to improve the output characteristics of the engine.

When the engine is further operated at a higher speed and higher load, the previously discussed mechanism for preventing an increase in supercharging pressure does not function it is possible to generate a further increase in supercharging pressure. However, in this case, the bypass control valve acts to prevent such an increase. Accordingly, the exhaust gas turbocharger can therefore be designed so that the supercharging pressure increases through all the operating regions with no worry that the supercharging pressure increases above the pressure Pa for valve opening in the velocity control device 31. Therefore, through the increase in supercharging pressure in the low load region, it is possible to improve the torque characteristics.

However, in the case where both the bypass control valve device and the velocity control device for exhaust gas flow are set to open at the same value, or in the case where only the bypass control valve device is disposed, the exhaust gas turbine, which had been rotating, is excessively rotated by inertia immediately after the bypasses control valve is opened. Therefore, the response to lowering the supercharging pressure is reduced, so that knocking is generated, or the back pressure is rapidly reduced so that it is possible to damage the catalytic device in the exhaust system. However, in the present invention, the velocity control valve for exhaust gas flow opens before the bypass control valve is opened. Consequently, the frequency of use of the bypass control valve is minimized, and the abovementioned inconveniences do not occur so often. At the same time, the durability of the bypass control valve is increased, and its pressure setting for valve opening is stabilized, making it possible to provide good protection for the engine.

In addition, the intake port of the bypass duct 21 of the bypass control valve device 22 is disposed upstream of the throttling valve 32 of the velocity control device 31. By this arrangement, when the problems such as breakdown or seizure occur prior to the complete opening of the exhaust gas flow velocity control device, the bypass control valve is opened to compensate the requirement. The exhaust gas flows into the bypass duct on the upstream side of the bypass control valve, so that the increase in supercharging pressure is prevented, and the engine is protected.

In addition, the throttle valve 32 of the velocity control device 31 for exhaust gas flow is subjected to a pulsating pressure of the exhaust gas and can be easily vibrated. To prevent this, the pressurized surface area of the diaphragm 33A is made sufficiently large, and when it is possible to vibrate the throttling valve 32 by the pulsation of the exhaust gas pressure, this valve 32 is maintained in a predetermined position by the diaphragm 33A. The velocity control device 31 is adapted to completely open when the bypass control valve opens in the embodiment, but the control range of the velocity control device for exhaust gas flow may overlap that of the bypass control valve to a certain degree.

In this embodiment, the velocity control device 31 and the bypass control valve device 22 may be controlled by means of a controller 41 which controls the injected fuel amount of the injection valve 7. In this case, a three-way solenoid valve 42 is disposed in the pressure duct 34 of the exhaust gas flow velocity control device 31, and a similar three-way solenoid valve 43 is disposed in the pressure duct 24 of the bypass control valve device 22. These three-way solenoid valves 42 and 43 reduce the introduced supercharge pressure by the atmosphere, and supplies the supercharge pressure into the diaphragm devices 33 and 25 respectively, wherein the supplied amount of atmosphere is varied by changing the current value or the amount of time during the current supply on the basis of a pulse at a predetermined frequency. The amount of valve opening is thus controlled in the velocity control device 31 and the bypass valve control device 22.

In this way, in order to control the three-way solenoid valves 42 and 43, the controller 41, e.g. a microcomputer, receives the following signals—the supercharging pressure output from the output sensor 13; a rotational speed signal (detailed description not given) which is outputted by a rotation sensor 44 used to detect the speed of rotation of the internal combustion engine 1; a signal outputted by the air flow meter 11 and showing intake air flow; and a signal closely related to the air-fuel ratio, based on an oxygen density signal which is outputted by the oxygen sensor 15. An optimum value in the operating status at that time is read out from control target values previously stored in a memory, and is processed and controls the injection valve 7 to inject the fuel at an optimum state. At the same time, command signals for providing the optimum degree of opening for the velocity control device 31 and the bypass control valve device 22 are outputted to the three-way solenoid valves 42 and 43. It is therefore possible to electronically feedback-control the supercharging pressure through the velocity control device 31 and the supercharging pressure through the bypass control device 22.

Various modifications will become possible for those skilled in the art after receiving by the teachings of the present disclosure without departing from the scope thereof.

What is claimed is:

1. A supercharge pressure control apparatus comprising:
    a turbocharger having an exhaust turbine rotated by exhaust gas flow of an internal combustion engine and a compressor rotated by the exhaust turbine for means controlling the speed of the exhaust gas flow toward the turbine and having a valve member disposed in the turbine, said speed controlling means being responsive to a first control pressure level being greater than a first set pressure for opening said valve means of said speed controlling means; bypass valve means controlling the exhaust gas flow bypassing the turbine and having a valve member disposed in the turbine, said bypass valve means being responsive to a second control pressure level being higher than a second set pressure for opening said valve member of said bypass valve means; a first aperture control means for controlling the valve member of the speed controlling means to have a predetermined aperture by detecting the supercharge pressure of the compressor and providing said first control pressure to said speed controlling means; a second aperture control means for controlling the valve member of the bypass valve means to have a predetermined aperture by detecting the supercharge pressure of the compressor and providing said second control pressure to said bypass valve means; wherein said first set pressure at which the valve member of the bypass valve means opens is greater than said second set pressure in which the valve member of the speed controlling means opens, and wherein the first and second control pressures are controlled so that the valve member of the bypass valve means is substantially open only after the valve member of the speed controlling means has been substantially completely opened relative to an increase in supercharge pressure.

2. A supercharge pressure control apparatus as claimed in claim 1, wherein said first aperture control means defines a control region for said speed controlling means in which the valve member of the speed controlling means is partially open and said second aperture control means defines a control region for said valve means wherein the valve member of the valve means is partially open and the region for controlling the supercharge pressure using the speed controlling means overlaps the region for controlling the supercharge pressure using the bypass valve means.

3. A supercharge pressure control apparatus as claimed in claim 1, wherein said first set pressure is determined by a diaphragm and a spring disposed in the bypass valve means.

4. A supercharge pressure control apparatus as claimed in claim 1, wherein said second set pressure is determined by a diaphragm and a spring disposed in the speed controlling means.

5. A supercharge pressure control apparatus as claimed in claim 1, wherein the speed controlling means and the bypass valve means respectively have diaphragm devices actuated by the first and second control pressures.

6. A supercharge pressure control apparatus as claimed in claim 5 wherein the first aperture control means comprises a three-way valve for receiving said supercharge pressure and atmospheric pressure and reducing said supercharge pressure by said atmospheric pressure to provide said first control pressure.

7. A supercharge pressure control apparatus as claimed in claim 1, wherein said supercharge pressure is detected by a sensor.

8. A supercharge pressure control apparatus as claimed in claim 7, wherein said sensor provides a signal indicative of said supercharge pressure to said first and second aperture control means.

9. A supercharge pressure control apparatus as claimed in claim 1, wherein said first aperture control means comprises a conduit for guiding supercharge pressure gas flow, and said speed controlling means comprises a chamber communicating with the conduit and having a diaphragm, and a spring member for biasing said valve member of said speed controlling means toward a closing direction thereof.

10. A supercharge pressure control apparatus as claimed in claim 1, wherein said second aperture control means comprises a conduit for guiding supercharge pressure gas flow, and said bypass valve means comprises a chamber communicating with the conduit and having a diaphragm, and a spring member for biasing said valve member of said bypass valve means toward a closing direction thereof.

* * * * *